Feb. 20, 1934.   R. R. POTTER ET AL   1,947,921

FASTENING

Filed June 14, 1930

INVENTORS
Rossiter R. Potter
Samuel G. Russell
BY Chappell Earl
ATTORNEYS

Patented Feb. 20, 1934

1,947,921

UNITED STATES PATENT OFFICE 1,947,921

FASTENING

Rossiter R. Potter and Samuel G. Russell, Kalamazoo, Mich., assignors to Shakespeare Products Company, Kalamazoo, Mich.

Application June 14, 1930. Serial No. 461,129

4 Claims. (Cl. 285—25)

The main object of this invention is to provide a fastening or mounting for dash controls and the like which avoids the use of threaded parts and at the same time is very secure.

A further object is to provide a fastening device which may be very quickly applied transversely of the article to be secured, thereby avoiding the necessity for threading or adjusting lengthwise of an article of considerable length such as controls for motor vehicles.

Objects pertaining to details and economies of our invention will definitely appear from the description to follow. The invention is defined in the claims.

A structure which embodies the features of our invention is clearly illustrated in the accompanying drawing in which.

Figure 1:
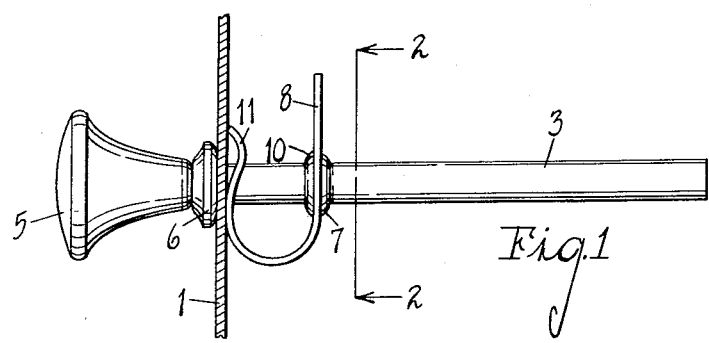
Fig. 1 is a side elevation of a mounting for dash controls embodying our invention, a fragment of the dash being shown in section.
Figure 3:
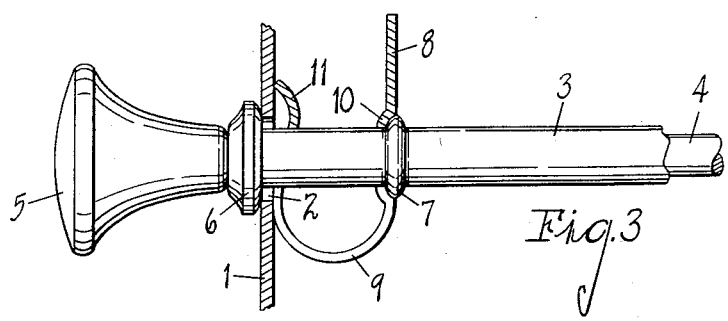
Fig. 3 is a detail side elevation partially in section on line 3—3 of Fig. 2.
Figure 2:
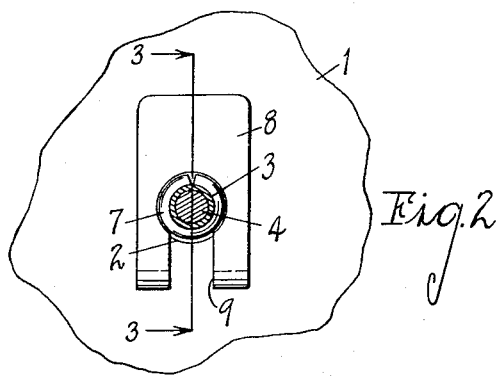
Fig. 2 is a fragmentary view in section on line 2—2 of Fig. 1.
Figure 5:
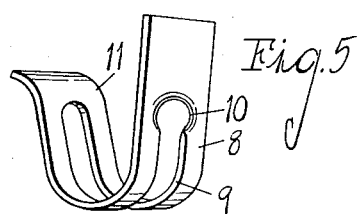
Fig. 5 is a perspective view thereof.
Figure 4:
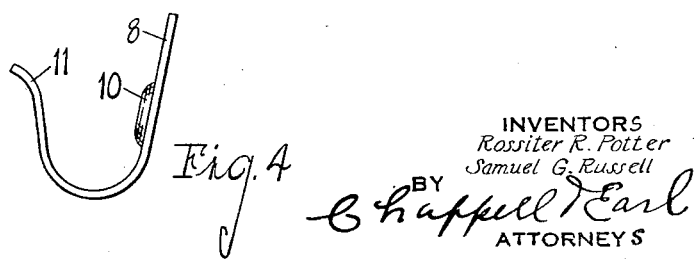
Fig. 4 is a side view of our improved fastening member.

In the accompanying drawing, 1 represents the instrument board of a motor vehicle provided with a hole 2 adapted to receive the tubular support 3 for the control rod 4. The control rod is provided with a fingerpiece 5 at its outer end. The support 3 is provided with a head 6 adapted to engage the face of the instrument board when the support is arranged through the hole 2 therein.

The support is provided with an annular spherically curved rib 7 spaced from its head and from the inner side of the instrument board. The U-shaped fastening member 8 has a longitudinal slot 9 extending from its bight end. The outer arm of this fastening member has a spherically curved seat 10 at the inner end of the slot which coacts with the rib 7, the parts having a ball and socket engagement thereby allowing the fastener to adjust itself to the coacting parts. The inner arm 11 of the fastening member is curved inwardly providing spaced parts which engage the instrument board of other supporting part, as the case may be, on opposite sides of the supported member 3.

This provides a three-point contact for the fastener and overcomes any tendency that otherwise might be present for the resilient fastening member to work off.

In assembling it is only necessary to insert the supported member through the base or part on which it is to be mounted and slip the fastener transversely over the same. This may be done very quickly and easily, and avoids the necessity for adjusting the fastening lengthwise of the device to be supported and also avoids the necessity for threaded parts. The fastening device being resilient prevents rattling and compensates for considerable variation in parts.

We have illustrated and described our improvements in an embodiment which we have found highly satisfactory. We have not attempted to illustrate or describe other embodiments or adaptations which we contemplate as it is believed that this disclosure will enable those skilled in the art to embody or adapt our improvements as may be desired.

Having thus described our invention what we claim as new and desire to secure by Letters Patent is:

1. In a control rod mounting, the combination with a base member having an opening therein, of a tubular member having a head at one end and an annular rib spaced from said head arranged through said opening with the head on one side of said base member and the rib on the other, and a resilient U-shaped fastening having a slot in its bight end adapted to receive the tubular member when the fastening member is presented transversely thereto, one arm of said fastening member having a seat at the inner end of the slot coacting with said rib, the other arm of said fastening member being inwardly curved providing spaced parts engaging the base member on opposite sides of said tubular member.

2. In a fastening, the combination with a base member having an opening therein, of a supported member having a head at one end and a rib spaced from said head arranged through said opening with the head on one side of said base member and the rib on the other, and a resilient U-shaped fastening having a slot in its bight end adapted to receive the supported member when the fastening member is presented transversely thereto, one arm of said fastening member being inwardly curved providing spaced parts engaging the base member on opposite sides of said supported member.

3. In a control rod mounting, the combination with a support, of a tubular member arranged through said support and having a head at one end and an annular rib spaced from said support, and a resilient U-shaped fastening having a slot in its bight end engaged with said tubular member, one arm of said fastening having a spherically curved seat at the inner end of the slot coacting with said rib.

4. In a control rod mounting, the combination of a tubular member provided with a head and with an annular rib spaced from said head, and a resilient U-shaped fastening member having a longitudinal slot in its bight end adapted to receive said tubular member, the outer arm of said fastening having a spherically curved seat at the inner end of the slot coacting with said rib, the other arm of the fastening being inwardly curved.

ROSSITER R. POTTER.
SAMUEL G. RUSSELL.